Aug. 29, 1950     L. E. FRASER     2,520,800
DEVICE FOR TYING BALING WIRES
Filed Dec. 21, 1948     3 Sheets-Sheet 1
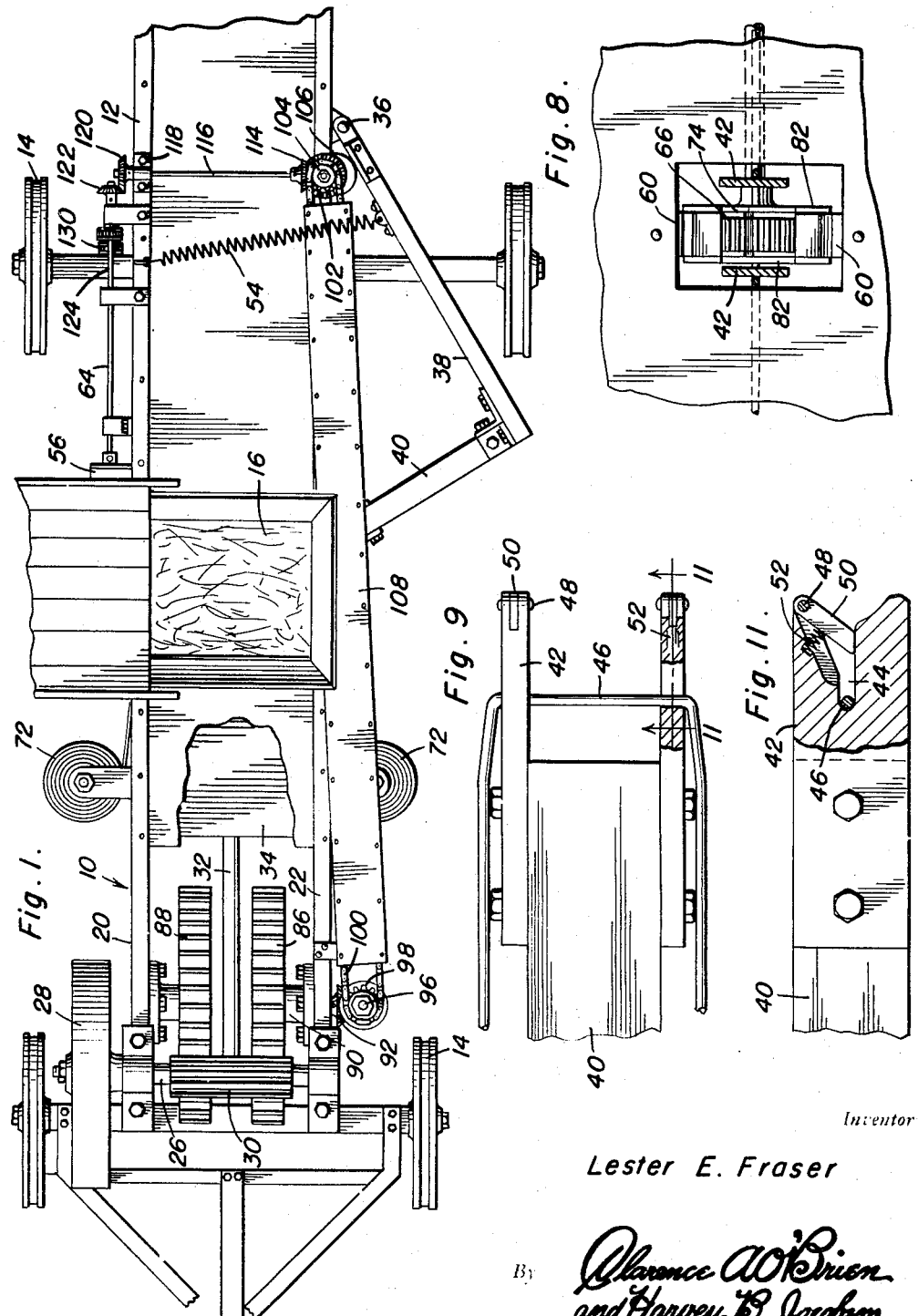
Inventor
Lester E. Fraser

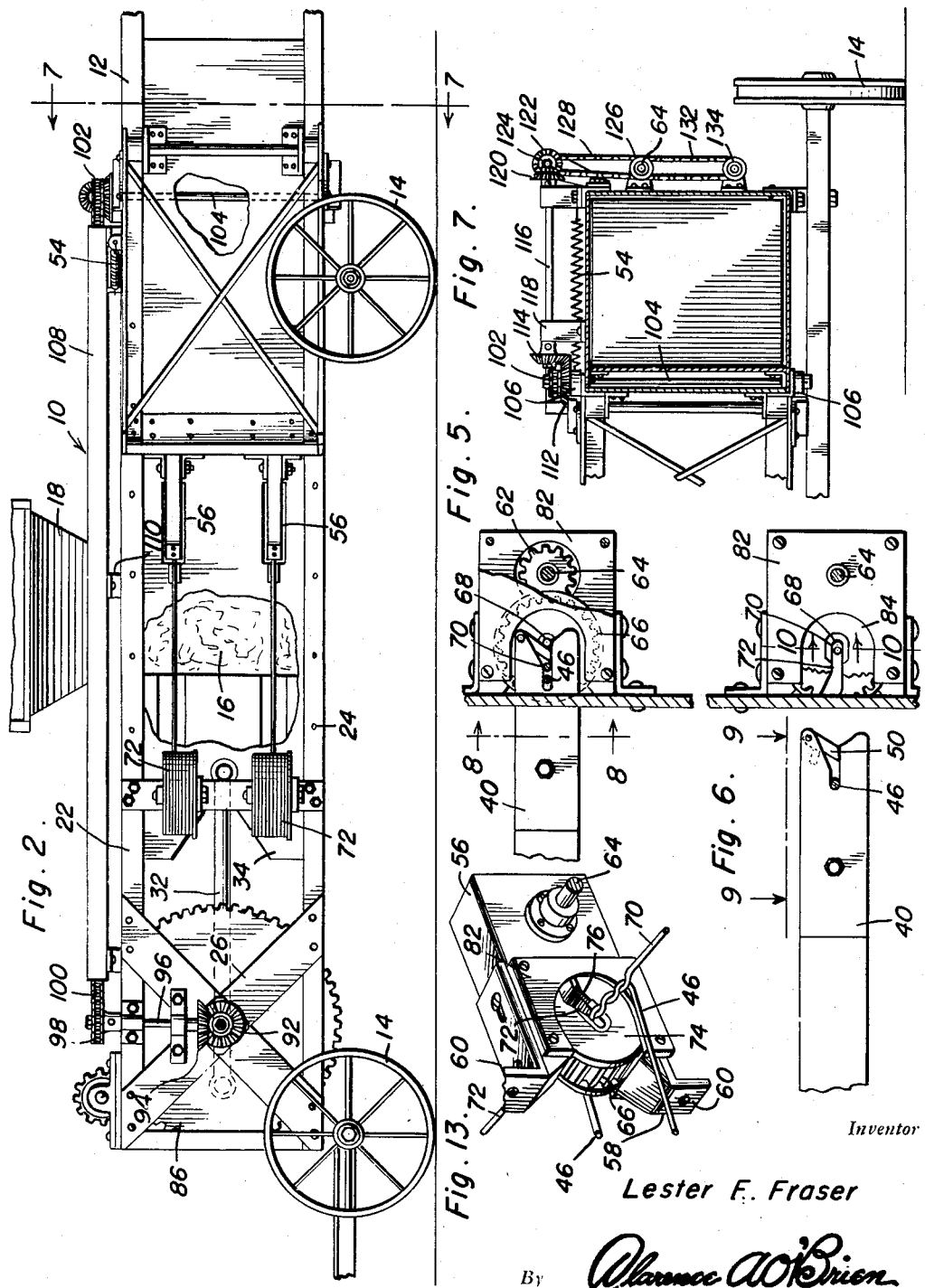

Aug. 29, 1950     L. E. FRASER     2,520,800
DEVICE FOR TYING BALING WIRES
Filed Dec. 21, 1948     3 Sheets-Sheet 3
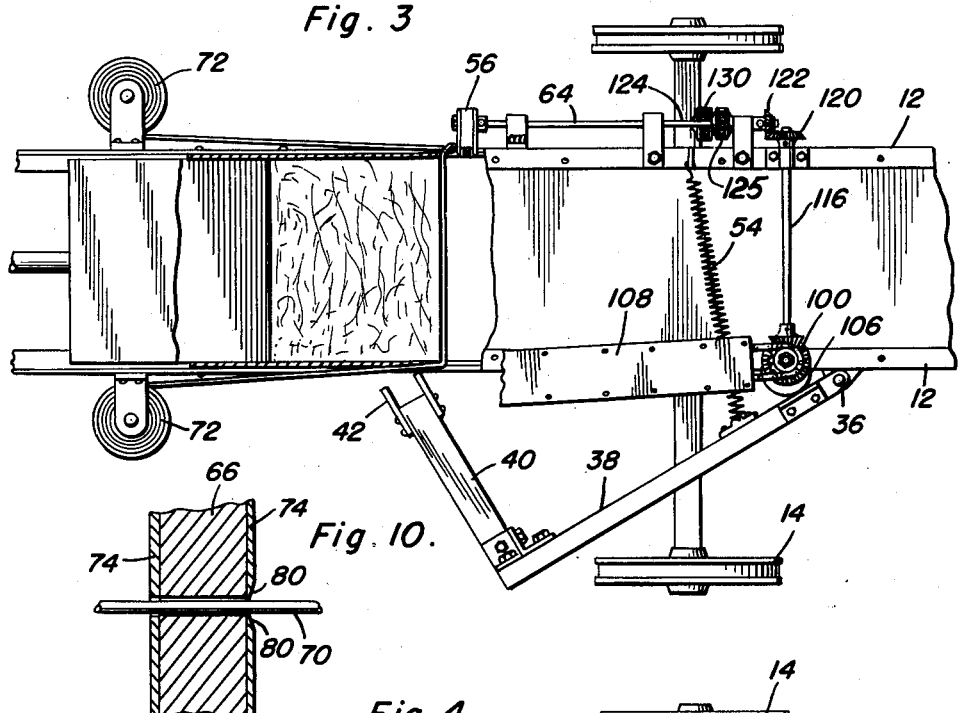
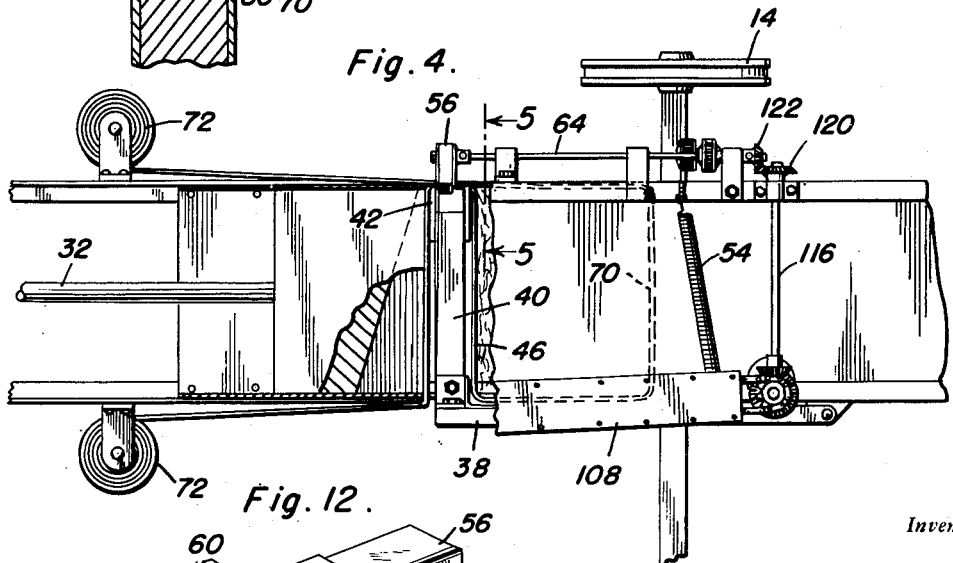
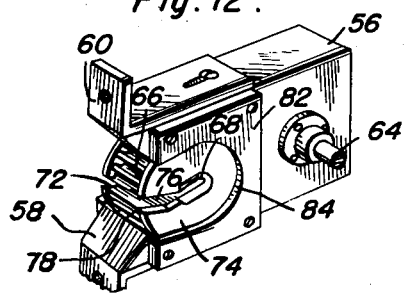
Inventor
Lester E. Fraser
By Clarence A. O'Brien
and Harvey B. Jacobson
Attorneys Patented Aug. 29, 1950

2,520,800

UNITED STATES PATENT OFFICE 2,520,800

DEVICE FOR TYING BALING WIRES

Lester E. Fraser, Osseo, Mich.

Application December 21, 1948, Serial No. 66,544

4 Claims. (Cl. 100—20)

The present invention relates to improvements in baling machines primarily adapted for baling hay, straw, and the like material.

The primary object of this invention is to provide a means for automatically and continuously tying bales with binding wires.

Yet another object of this invention is to provide an improved bale wire tying machine which automatically will tie the free ends of the binding wire or wires which have been passed around the bale and upon completion of the tie, sever the tied wires from the source of supply.

And a still further object of this invention is to provide in a baling machine having a frame, a baling chamber, a reciprocating plunger and means for operating said plunger; a means for automatically and continuously tying bales comprising feed spools of wire carried by the frame, means for gripping and urging the wire about the bales, means for twisting and severing the wire after it has enveloped the bales, and means for synchronously operating said gripping means and said twisting and severing means whereby said gripping means is retracted immediately after the wire has been twisted and severed.

These, together with various ancillary objects and features of the invention which will later become apparent as the following description proceeds, are attained by the device, a preferred embodiment of which has been illustrated by way of example only in the accompanying drawings, wherein:

Figure 1 is a top plan view of a baling machine incorporating the tier of the instant invention;

Figure 2 is a side elevational view of the baling machine, some parts being broken away to show details of construction;

Figure 3 is a fragmentary top plan view of the baling machine showing only the tier and associated parts;

Figure 4 is a view similar to Figure 3 showing the gripping arm moved into position to engage the twisting and tying mechanism;

Figure 5 is a sectional view taken substantially in the plane of section line 5—5 of Figure 4;

Figure 6 is a sectional view similar to that shown in Figure 5 illustrating the approach of the gripping arm to the twisting mechanism;

Figure 7 is a sectional view taken substantially in the plane of section line 7—7 of Figure 2;

Figure 8 is a sectional view taken substantially in the plane of section line 8—8 of Figure 5;

Figure 9 is a fragmentary plan view of one of the gripping arms taken from the plane of section line 9—9 of Figure 6, some parts being shown in section;

Figure 10 is a sectional view taken substantially in the plane of section line 10—10 of Figure 6;

Figure 11 is a sectional view taken substantially on the plane of section line 11—11 of Figure 9;

Figure 12 is a perspective view of the twisting and severing mechanism; and

Figure 13 is a view similar to that shown in Figure 12 illustrating the twisting of the wire.

Specific reference is now made to the drawings. In the several views in the accompanying drawings and in the following specification reference characters indicate corresponding elements throughout.

Indicated generally at 10 is a baling machine of conventional design and construction having a frame 12 carried on wheels 14 for receiving hay or other material 16 from a chute 18. The frame 12 includes upper longitudinally extending frame members 20 and 22 and lower frame members 24, the upper and lower members being interconnected by cross braces. Rotatably journaled in suitable bearings carried by the frame member 20 and 22 is a transversely extending rotatable axle 26 which carries a pulley 28 at one end for engaging a belt (not shown) for driving engagement with a motor (not shown). The axle 26 is provided with an elongated gear 30 which drives, in a manner to be set forth hereinafter a piston rod 32 to which is pivoted a piston 34. The piston 34, therefore, constitutes a reciprocating plunger working within the baling chamber for compressing the hay and other material into a bale.

Pivotally secured to the sides of the frame as at 36 is a pair of substantially L-shaped arms 38, the shorter leg 40 of which is provided with spaced extensions 42 having longitudinally extending slits 44 for receiving the baling wire 46. Pivoted to the top of each of the extensions, as at 48, is a latch 50 which opens inwardly of the slit 44 and is urged outwardly to a closed position by means of a spring 52. Thus the wire 46 gripped by the extensions 42 can freely enter but cannot leave the slits 44. A spring 54 is terminally secured to the arms 38 adjacent the pivot 36 and to the other side of the frame for normally urging the arms inwardly across the frame and towards the wire twisting mechanism soon to be described.

The wire twisting and severing mechanism is best shown in Figures 12 and 13, it being understood that there is one mechanism for each arm 38. The mechanism consists of a housing 56 having an outwardly tapered opening 58 at its forward end. Secured to the top and bottom of the housing and extending to its forward end is a pair of L-shaped brackets 60 for securing the housing to appropriate side frames opposite the shorter legs 40 of the arms 38. In the rear of the housing is positioned a gear 62 secured to a rotatable shaft 64 extending through a side of the housing. Meshing with the gear 62 is a gear wheel 66 having an axial bore 68 through which extends a portion of the wire 70 fed from spools 72 carried on the side frames by appropriate brackets.

Extending radially from the bore 68 to the end of the gear wheel 66 is a wire receiving slit 72. Secured to the sides of the gear wheel are side plates 74 having radially extending slits 76 aligned with the slit 72. The plates 74 have upturned wire engaging fingers 78 at their slitted ends. One of the plates 74 is centrally tapered to provide knife edges 80 for grooving the wires 46 and 70 passing therethrough. Secured to the sides of the housing 56 adjacent the plates 74 are further plates 82 having arcuate recesses 84 for a purpose to be later described.

A driving means is provided for synchronously operating the pivoted gripping arms 38 and the twisting mechanism which will be described hereinafter. The gear 30 meshes with a pair of relatively large gears 86 and 88 secured together adjacent their peripheral edge by a pinion (not shown) which mounts the free end of the piston rod 32. The gears 86 and 88 are secured to a shaft 90 carried by the side frame members one end of which shaft has a bevel gear 92 which meshes with another bevel gear 94 secured in turn to a further shaft 96 appropriately journaled to the frame 12. The free end of shaft 96 carries a sprocket 98 over which is entrained an endless chain 100 which further engages a sprocket 102 carried in turn on a shaft 104. Further secured to the shaft 104 adjacent the sprocket 102 is a cam 106 and a shield 108 carried by the frame as at 110 envelopes the chain 100 to protect the latter. Thus it will be seen that the pulley 28 driven from a motor (not shown) reciprocates the piston 34 to pack material 16 against the wire and at the same time drives the cam 106 which abuts the pivoted arm 38 to urge the latter in and out across the frame towards and away from the twisting mechanism 56.

Secured to the shaft 104 adjacent the cam 106 is a bevel gear 112 which meshes with a further bevel gear 114 carried on a transverse shaft 116 supported on the frame by bearings 118. The other end of the shaft 116 carries a further bevel gear 120 which meshes a bevel gear 122 carried on the shaft 124. Positioned on shaft 124 is a sprocket 125 which engages a chain 128 entrained over a lower sprocket 126 carried on shaft 64 drivingly connected to the upper twisting mechanism 56. Beside sprocket 126 on shaft 64 is a further sprocket 130 which engages a chain 132 which is further entrained over another sprocket 134 carried on a lower shaft which drives the lower twisting mechanism, it being understood that there are two gripping arms 38 and two twisting mechanisms 56.

In practical operation, the wire 70 passes through the axial bores in the two twisting mechanisms and the reciprocating piston forces the material to be baled up against the wire 70 as shown in Figure 4. In this position, the wire is around three sides of the bale adjacent the top and bottom thereof. By virtue of the cam 106, the gripping arms, at this stroke, have engaged the portion 46 of the wire which is received in the slit 44 of the arms. The arms carrying the wire 46 enter the opening 58 of the twisting mechanisms with the extensions 42 entering the recesses 84 of the side plates 82. As the gear 66 turns, the upturned fingers 78 engage the wire 46 to move the latter into the radial slit 72 as shown in Figure 5, the wire portions 46 and 70 lying parallel to each other. Further turning of the gear 66 twists the wires relative to each other as shown in Figure 13 while the knife edges 80 groove the wires. Since the wires cannot leave the slit 44 because of the one way latch 50, retraction of the arms 38 will cause the latch to engage the twisted wires and sever them at the groove. When the arms 38 are fully retracted to the position shown in Figure 3, the piston begins to compress and force the material 16 against the wire 70 once again and at the end of its stroke, the arms 38 again engage the twisting and severing mechanisms 56 to repeat the cycle.

It should be remembered that while two gripping arms and two twisting and severing mechanisms have been described, one of each means may be employed to advantage if desired.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a baling machine having a frame, a baling chamber, a reciprocating plunger and means for operating said plunger; a means for automatically and continuously tying bales comprising feed spools of wire carried by the frame, means for gripping and urging the wire about the bales, means for twisting and severing the wire after it has enveloped the bales, and means for synchronously operating said gripping means and said twisting and severing means whereby said gripping means is retracted immediately after the wire has been twisted and severed, said means for operating said gripping and twisting means including a shaft mounted longitudinally on said frame and operatively connected to said twisting means, a shaft mounted transversely on said frame, gear means drivingly connecting one end of said transverse shaft to said longitudinal shaft, an endless chain driven by said plunger operating means, a sprocket driven by said chain, gear means interconnecting said sprocket with the other end of said transverse shaft, a further shaft mounted on said frame and securing said sprocket, and a cam carried by said further shaft for operating said gripping means.

2. The combination of claim 1, wherein said gripping means includes an arm pivoted to said frame, a wire receiving slit at the free end of said arm, and a spring urged latch for retaining the wire in the slit.

3. The combination of claim 2, wherein said twisting and severing means includes a housing, means for receiving a portion of said wire gripping means, a cylindrical member rotatable in said housing having an axial bore for receiving a portion of the wire, a radial open-end slot in said member extending to said axial bore, and means carried by said cylindrical member for engaging and urging that portion of the wire carried by said wire gripping means toward said axial bore whereby said portions of the wire are twisted and then severed.

4. The combination of claim 3, wherein said last-named means includes a pair of plates secured to said cylindrical member having radially extending slits and including upturned wire engaging fingers on said plates at the open-ends of said slits.

LESTER E. FRASER.

REFERENCES CITED

The following references are of record in the file of this patent:

UNITED STATES PATENTS

| Number | Name | Date |
|---|---|---|
| 367,489 | Wood | Aug. 2, 1887 |
| 1,404,447 | Koontz | Jan. 24, 1922 |
| 2,485,001 | Kane | Oct. 18, 1949 |

FOREIGN PATENTS

| Number | Country | Date |
|---|---|---|
| 320,870 | Germany | May 5, 1920 |